United States Patent
Matei et al.

(10) Patent No.: US 12,470,320 B2
(45) Date of Patent: Nov. 11, 2025

(54) SYSTEM AND METHOD FOR ESTIMATING ERRORS IN A SENSOR NETWORK IMPLEMENTING HIGH FREQUENCY (HF) COMMUNICATION CHANNELS

(71) Applicant: Palo Alto Research Center Incorporated, Palo Alto, CA (US)

(72) Inventors: Ion Matei, Mountain View, CA (US); Raman Goyal, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 440 days.

(21) Appl. No.: 18/077,108

(22) Filed: Dec. 7, 2022

(65) Prior Publication Data

US 2024/0195524 A1 Jun. 13, 2024

(51) Int. Cl.
 *H04L 1/00* (2006.01)
(52) U.S. Cl.
 CPC .................... *H04L 1/0036* (2013.01)
(58) Field of Classification Search
 CPC .. H04B 17/27; H04B 17/373; H04B 17/3913; H04W 4/029; H04W 52/0258; H04W 4/40; H04W 4/70; H04W 4/02; G06N 20/00; Y02D 30/70; H04L 1/004; H04L 25/0202; H04L 1/0036
 See application file for complete search history.

(56) References Cited

U.S. PATENT DOCUMENTS

| | | | | |
|---|---|---|---|---|
| 11,489,602 B2* | 11/2022 | Jornod | ............... | H04B 17/373 |
| 11,641,244 B2* | 5/2023 | Jornod | ............... | H04W 4/46 |
| | | | | 455/67.13 |
| 11,989,829 B2* | 5/2024 | Zhu | ............... | G06T 17/05 |
| 12,078,775 B2* | 9/2024 | Shapiro | ............... | G06N 3/045 |
| 12,126,467 B2* | 10/2024 | Andrews | ............... | G06N 3/0475 |
| 2016/0259942 A1* | 9/2016 | Wang | ............... | G06N 7/01 |
| 2021/0297171 A1* | 9/2021 | Jornod | ............... | G06N 20/00 |
| 2021/0297172 A1* | 9/2021 | Jornod | ............... | H04B 17/27 |
| 2022/0003894 A1* | 1/2022 | Shapiro | ............... | G01W 1/10 |
| 2022/0300824 A1* | 9/2022 | Shahid | ............... | H04W 48/16 |
| 2023/0316075 A1* | 10/2023 | Cella | ............... | G06Q 20/3829 |
| 2024/0001942 A1* | 1/2024 | Mueller | ............... | B60W 60/001 |
| 2024/0187052 A1* | 6/2024 | Sun | ............... | H04B 7/0626 |
| 2024/0303925 A1* | 9/2024 | Zhu | ............... | G06N 3/045 |

* cited by examiner

Primary Examiner — Jung Liu (57) ABSTRACT

One embodiment can provide a method and system for estimating a remote quantity of interest (QoI). During operation, the system can receive, over a communication channel, a radio frequency (RF) signal carrying an estimate of the QoI measured by a sensor. The system can estimate probability distributions of a set of random channel parameters associated with the HF communication channel. The system can further reconstruct the estimate based on the probability distributions of the channel parameters and the received RF signal, determine a level of uncertainty associated with the reconstructed estimate, and combine reconstructed estimates from multiple sensors based on the determined level of uncertainty associated with each reconstructed estimate to output a combined estimate of the QoI.

18 Claims, 9 Drawing Sheets

SYSTEM AND METHOD FOR ESTIMATING ERRORS IN A SENSOR NETWORK IMPLEMENTING HIGH FREQUENCY (HF) COMMUNICATION CHANNELS

RELATED APPLICATION

This application is related to U.S. patent application Ser. No. 17/963,894, entitled "SYSTEM AND METHOD FOR SYMBOL DECODING IN HIGH FREQUENCY (HF) COMMUNICATION CHANNELS," filed 11 Oct. 2022, by inventors Ion Matei and Johan de Kleer, the disclosure of which is herein incorporated by reference in its entirety.

BACKGROUND

Field

This disclosure is generally related to uncertainty estimation in information received from sensor networks. More specifically, this disclosure is related to estimating uncertainties in sensor data transmitted over HF communication channels represented using machine-learning models.

Related Art

Figure 1:
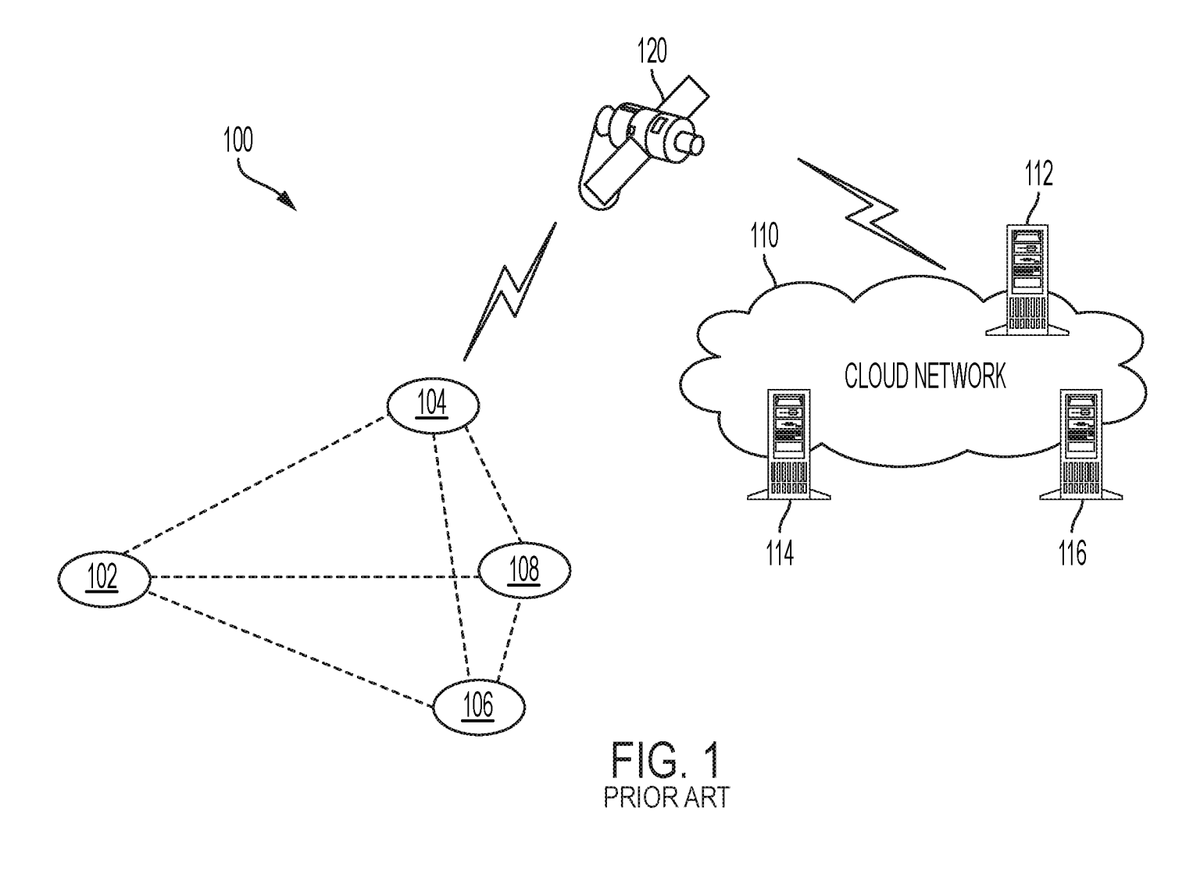
FIG. 1 illustrates an exemplary Ocean of Things system, according to prior art.

To enable persistent maritime situational awareness over large ocean areas, the Ocean of Things project deploys thousands of small, low-cost floats that form a distributed sensor network in the ocean. Each smart float contains a number of sensors to collect environmental data (e.g., sea surface temperature, sea state, and location) as well as activity data about commercial vessels, aircraft, and even marine mammals moving through the area. The floats transmit data periodically via satellite to a cloud network for storage and real-time analysis, as shown in FIG. 1, which illustrates an exemplary Ocean of Things system, according to prior art. More specifically, in FIG. 1, an Ocean of Things system 100 can include a number of floating devices (e.g., devices 102-108) scattered in a large ocean area. Sensor data can be sent from the floating devices to a cloud network 110 (which can include cloud servers 112-116) via a satellite 120. Satellite communication can be expensive and often have poor latency.

SUMMARY

One embodiment can provide a method and system for estimating a remote quantity of interest (QoI). During operation, the system can receive, over a communication channel, a radio frequency (RF) signal carrying an estimate of the QoI measured by a sensor. The system can estimate probability distributions of a set of random channel parameters associated with the communication channel. The system can further reconstruct the estimate of the QoI based on the probability distributions of the channel parameters and the received RF signal, determine a level of uncertainty associated with the reconstructed estimate, and combine reconstructed estimates from multiple sensors based on the determined level of uncertainty associated with each reconstructed estimate to output a combined estimate of the QoI.

In a variation on this embodiment, the communication channel can include a high-frequency (HF) communication channel and estimating the probability distributions of the random channel parameters can include training a surrogate channel model having a channel parameter space with a reduced dimension and simulating behaviors of the HF communication channel using the trained surrogate channel model.

In a further variation, training the surrogate channel model can further include training the surrogate channel model jointly with a variational autoencoder (VAE) model that is configured to output channel parameters defined in the channel parameter space with the reduced dimension.

In a further variation, the surrogate channel model and the variational autoencoder (VAE) model can be trained jointly using training samples generated by a high-fidelity physics-based channel model.

In a variation on this embodiment, the system can encode the estimate of the QoI into an RF signal to be transmitted over the communication channel using a quadrature amplitude modulation (QAM)-based orthogonal frequency-division multiplexing (OFDM) encoder.

In a variation on this embodiment, reconstructing the estimate can include using a previously trained machine-learning decoder to directly learn probability distributions of symbols representing the estimate.

In a variation on this embodiment, determining the level of uncertainty associated with the reconstructed estimate can include computing a covariance matrix of a joint probability distribution of the reconstructed estimate and the channel parameters.

In a further variation, computing the covariance matrix can include performing spectral expansion on the reconstructed estimate.

In a further variation, computing the covariance matrix can include computing an unscented transform on the reconstructed estimate.

In a further variation, combining the reconstructed estimates from the multiple sensors can include assigning a weight to each reconstructed estimate, wherein the weight is inversely proportional to a trace of the covariance matrix, where the covariance matrix is a metric of measurement uncertainty.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein provide a system and method for estimating and reducing estimation errors in data sent from sensor networks over high-frequency (HF) communication channels. The system can quantify both the uncertainty in sensor measurement and the uncertainty in the HF channel. More specifically, the uncertainty in the sensor measurement can be modeled using Kalman filters, and the uncertainty in the HF channels can be modeled using a machine-learning-based surrogate channel model, which has a reduced parameter space compared with a physics-based channel model. The surrogate channel model can be trained offline using large-scale optimization algorithms. At the receiver, a machine-learning-based decoder can be implemented to recover the transmitted signal, which is affected by the HF transmissions. The system can further include an information-fusion unit configured to combine data received from multiple sensor systems based on the uncertainties associated with the decoded data. More specifically, to minimize the detection error, data from the multiple sensor systems can be combined based on the level of uncertainty associated with each sensor system.

Sensor Network Implementing HF Communication Channels

Figure 2:
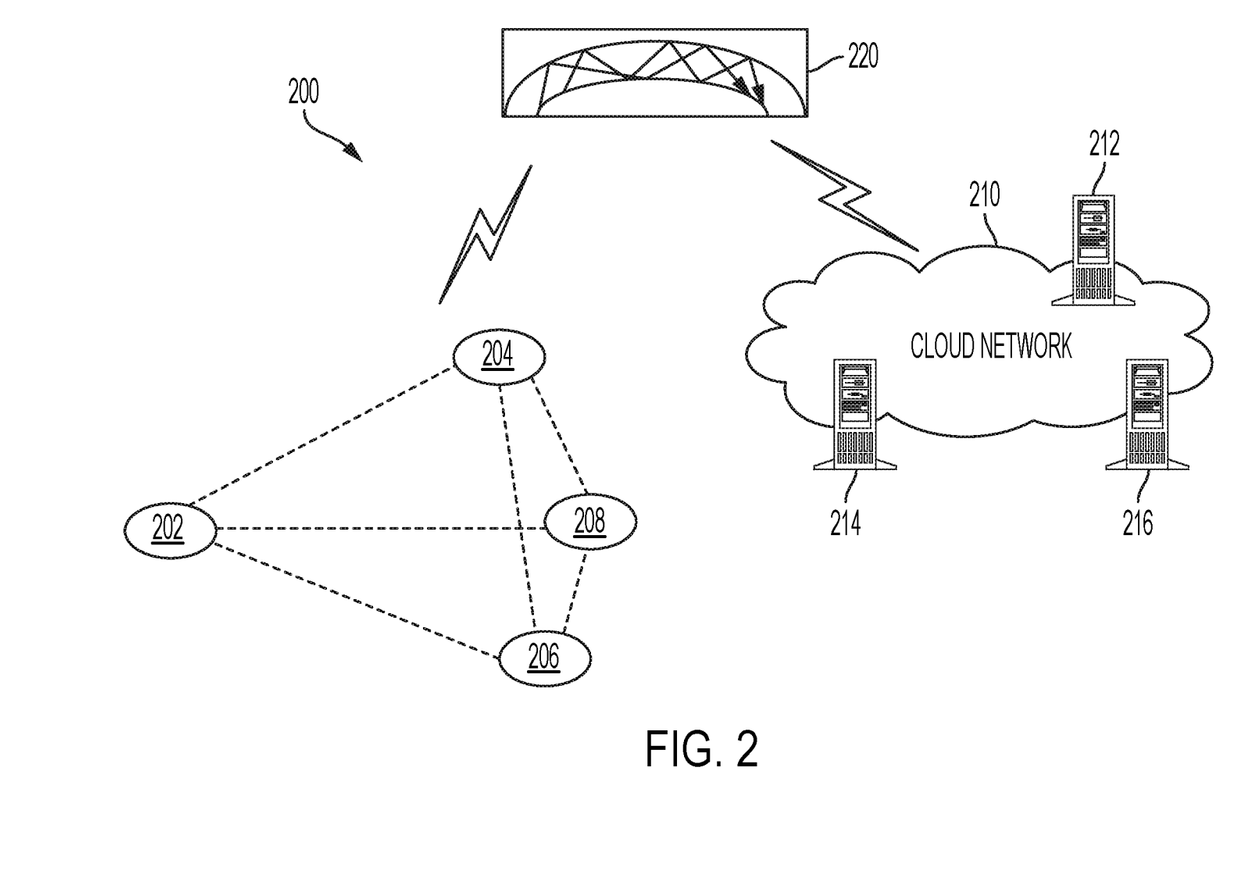
FIG. 2 illustrates an exemplary Ocean of Things high-frequency (OoT-HF) communication system, according to one embodiment.

Transmitting sensor data from the ocean floats via satellites can be slow and expensive. To reduce communication latency and cost, the ocean floats can use Beyond-Line-of-Sight (BLOS) high-frequency (HF) communication channels to transmit data to the cloud servers. HF communication is widely used in long-distance communications, such as military communications, aviation air-to-ground communications, maritime sea-to-shore and ship-to-ship communications, etc. The dominant means of signal transmission in HF communication is skywave propagation, in which radio waves directed at an angle into the sky refract back from layers of ionized atoms in the ionosphere. Skywave propagation can allow HF radio waves to travel beyond the horizon, around the curve of the Earth, and be received at intercontinental distances using low-cost and simplified infrastructure. FIG. 2 illustrates an exemplary Ocean of Things high-frequency (OoT-HF) communication system, according to one embodiment. In FIG. 2, an OoT-HF communication system 200 can include a number of floating devices (e.g., devices 202-208) scattered in a large ocean area. Each floating device can include one or more sensors for collecting various types of environmental data as well as information related to human activities. Examples of the sensors can include but are not limited to: temperature sensors, motion sensors, radio frequency (RF) sensors, light sensors, etc. Data collected by the sensors can be sent to a cloud network 210 (which can include cloud servers 212-216) via HF channels provided by ionosphere 220.

Due to the changing conditions of ionosphere 220 (which can be significantly affected by factors like time of the day, geographic locations, activities of the sun such as solar storms, or human activities), the HF channels can be time varying, with large delay spread, and having frequency-dependent fading. Ionosphere 220 can introduce multi-path signal splitting along with associated delays, power attenuation (i.e., fading), and frequency shifts (i.e., Doppler shifts). Current modulation-based data encoding/decoding algorithms (e.g., quadrature amplitude modulation (QAM)-based orthogonal frequency-division multiplexing (OFDM)) are very sensitive to the non-stationary nature of the HF channels, resulting in unreliable and uncertain communication. Conventional HF communication systems can be noisy with high bit error rates.

To improve the performance of the OoT-HF communication system (e.g., to lower the bit error rate (BER) without increasing the signal-to-noise ratio (SNR)), in some embodiments, the OoT-HF communication system can implement, at the receiver, a decoder implementing machine-learning (ML) techniques that can directly predict the symbols transmitted by the floats. A detailed description of the ML technique used for direct symbol learning can be found in copending U.S. patent application Ser. No. 17/963,894, entitled "SYSTEM AND METHOD FOR SYMBOL DECODING IN HIGH FREQUENCY (HF) COMMUNICATION CHANNELS," filed 11 Oct. 2022, by inventors Ion Matei and Johan de Kleer, the disclosure of which is herein incorporated by reference in its entirety.

Even with the ML-based symbol learning, signals transmitted via the HF channel will accumulate uncertainty (i.e., random errors) along the communication path. In addition to errors caused by the HF communication, the output of the sensors (which can indicate the measurement result of a particular quantity of interest (QoI) such as ocean temperature or vessel trajectories) often includes certain errors or uncertainties, and different sensors may produce different amounts of uncertainties. The uncertainties produced by the sensors can propagate along the transmission path (i.e., the HF channel) and be combined with the HF-channel-induced uncertainties. When a receiver receives signals carrying information from the different sensors, it is important that the receiver can quantify the uncertainties in each received signal. This quantification can enable the receiver to optimally combine the information received from the sensors to reduce errors in the estimation of the QoI, such that a subsequent decision process (e.g., planning and mapping maritime traffic, constructing an ocean temperature-gradient map, etc.) can use the estimated QoI with high confidence.

Figure 3:
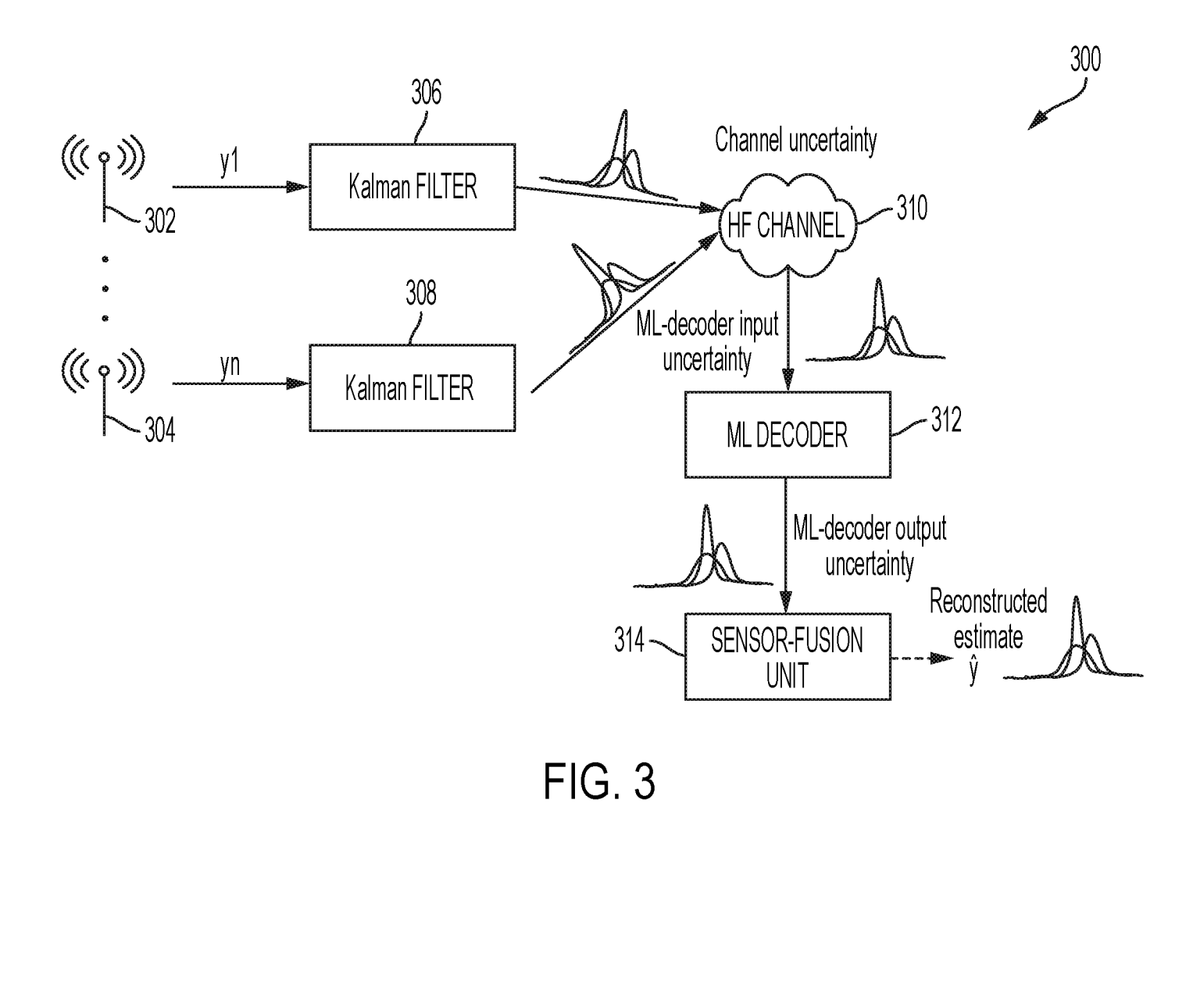
FIG. 3 illustrates an accumulation of uncertainties in the OoT-HF communication system, according to one embodiment.

FIG. 3 illustrates an accumulation of uncertainties in the OoT-HF communication system, according to one embodiment. FIG. 3 shows that OoT-HF communication system 300 can include a number of sensors (e.g., sensors 302 and 304) for performing measurement on a particular QoI (e.g., temperature, or pressure, etc.). The output of the sensors can be denoted $y_1, \ldots, y_n$. According to some embodiments, the output of the sensors over a predetermined interval can be sent to respective Kalman filters, which can provide estimates of the QoI. In the example shown in FIG. 3, the output of sensor 302 is sent to Kalman filter 306, and the output of sensor 304 is sent to Kalman filter 308. Each Kalman filter can output an estimate of the measured QoI along with the variance or uncertainty of the estimate. In addition to Kalman filters, other mechanisms can also be used to provide the local estimation of the QoI. In alternative embodiments, particle filters may also be used. The output of the Kalman filters (or particle filters) can be transmitted, over an HF channel 310 to an ML decoder 312. HF channel 310 can induce additional uncertainty (i.e., channel uncertainty) to the transmitted signals due to the randomness of the channel parameters. While using the ML techniques to predict the symbols, ML decoder 312 may add additional uncertainty (e.g., random symbol-reconstruction errors) to the detected symbols. The output of the ML decoder 312 can indicate the QoI estimate from each sensor with the additional channel- and decoder-induced uncertainties. A sensor-fusion unit 314 can be responsible for combining the QoI estimates from the multiple sensors to obtain a reconstructed QoI estimate. For example, if there are multiple temperature sensors measuring ocean temperature at one location, sensor-fusion unit 314 can combine the signals from the multiple temperature sensors to obtain a reconstructed ocean temperature estimate for that location. According to some embodiments, while combining the estimates from the multiple sensors, sensor-fusion unit 314 can take into consideration the amount of uncertainty associated with each estimate. More particularly, sensor-fusion unit 314 may combine the multiple estimates as a weighted average, and estimates with a large amount of uncertainty (or a higher variance) can carry less weight than estimates with a smaller amount of uncertainty (or a lower variance).

In order to determine the amount of uncertainty associated with each estimate, in some embodiments, the system can quantify the uncertainty associated with each estimate using statistical models. For example, the system can determine the first and/or second moment (i.e., mean and/or variance) of the probability distribution associated with the estimate. In some embodiments, statistics of the sensor measurements can be modeled using Kalman filters. The output of the Kalman filter can be denoted u, which can indicate the probability distribution of the measured QoI.

As shown in FIG. 3, the outputs of the Kalman filters are transmitted over HF channel 310. In some embodiments, information associated with the estimate of the QoI (which can be expressed as a sequence of binary symbols) can first be encoded into an RF signal according to a modulation-based communication protocol (e.g., QAM-based OFDM) and then be transmitted over an HF channel (e.g., channel 310) to a decoder (e.g., ML decoder 312), which reconstructs the symbols to obtain the information. Successful decoding of the transmitted signals requires knowledge of the state of the HF channel. According to some embodiments, a machine-learning based channel model can be used to learn the channel parameters.

A typical physics-based HF channel model can have a large parameter space. Even a simple three-layer model (i.e., the ionosphere is modeled as having three layers) can have a nine-dimensional parameter space, considering that each layer can introduce different amounts of delay, attenuation, and frequency shift (i.e., Doppler shift). Such modeling can be computationally expensive and time-consuming. To reduce the computational cost for uncertainty quantification, in some embodiments, the channel parameter space can be reduced using an ML autoencoder that can map a higher dimensional parameter space to a lower dimensional parameter space. Moreover, due to the uncertainty associated with the channel parameters, a variational autoencoder (VAE) can be used to project the channel parameters into a lower dimension latent space, where the latent variables have a Gaussian distribution. The existence of the latent distribution is guaranteed by the generalized Polynomial Chaos (gPC) Wiener's theory.

In some embodiments, a surrogate channel model expressed using parameters from the reduced parameter space can be constructed. Compared with the more complex physics-based channel model, the surrogate channel model can provide a good approximation of the channel behavior while being computationally efficient. In further embodiments, the surrogate channel model can implement a neural network.

The VAE and the surrogate channel model are different ML models. According to some embodiments, to reduce the runtime computational cost, parameters of the VAE and the surrogate channel model can be trained simultaneously. More specifically, the VAE and the surrogate channel model can be trained offline using samples produced by a high-fidelity RF transceiver model that includes a QAM-based OFDM encoder, a physics-based channel model (e.g., a Watterson channel model), and an ML-based symbol decoder (which learns the symbol directly from the received RF signals). Note that the physics-based channel model can incorporate known knowledge associated with the time-varying behavior of the ionosphere.

Figure 4:
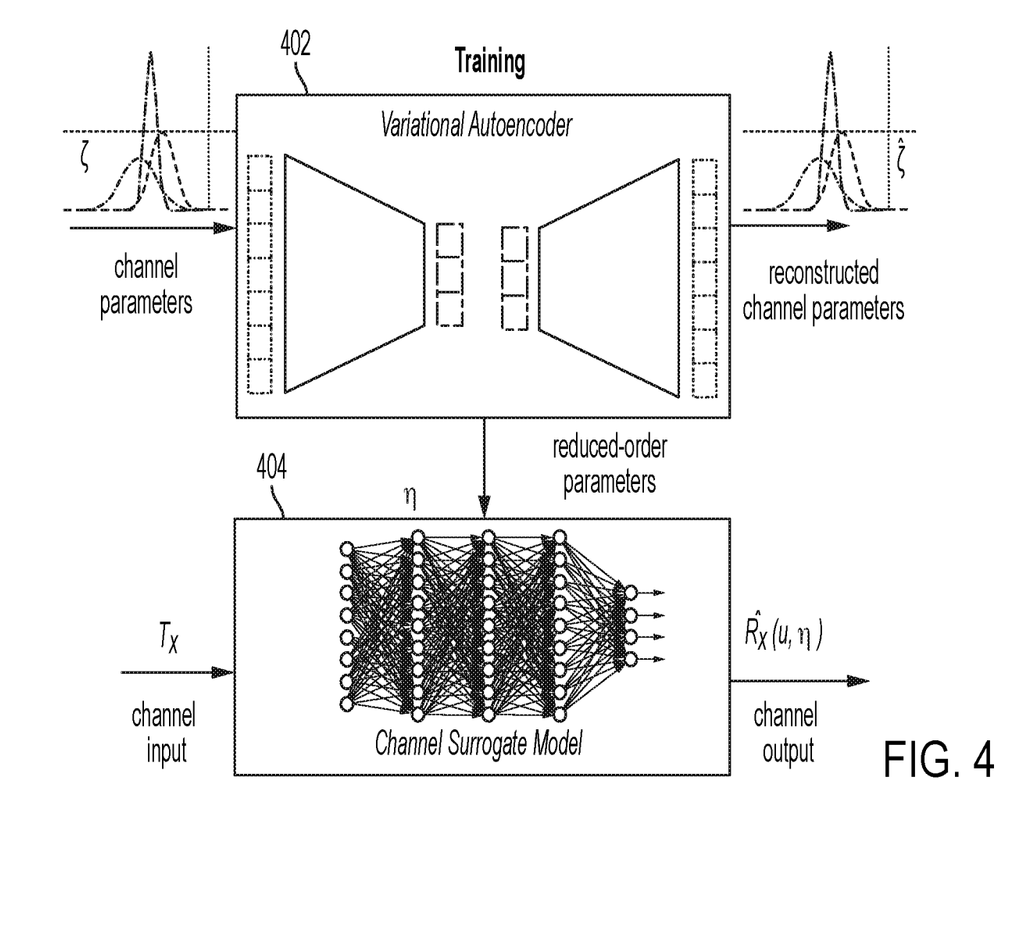
FIG. 4 illustrates an exemplary scheme for training a variational autoencoder (VAE) and a surrogate channel model jointly, according to one embodiment.

FIG. 4 illustrates an exemplary scheme for training the VAE and the surrogate channel model jointly, according to one embodiment. In FIG. 4, a VAE 402 can be trained using channel parameters (denoted $\zeta$) in the higher-order parameter space. The training samples can include measured channel parameters or parameters of a physics-based channel model (e.g., the Watterson model). VAE 402 can output channel parameters (denoted $\eta$) in the reduced-order parameter space. A surrogate channel model 404 can receive as input the reduced-order channel parameters. Given the reduced-order channel parameters and an encoded signal $T_x$, surrogate channel model 404 can predict HF channel output $\hat{R}_x(u, \eta)$. For the OoT application, encoded signal $T_x$ can be generated (e.g., by a QAM-based OFDM encoder) based on the output of the Kalman filters (i.e., u). For the purpose of training surrogate channel model 404, a sequence of known symbols can be used as training samples. In some embodiments, gradient-based optimization algorithms, such as the Adaptive Moment Estimation (ADAM) algorithm, can be used to train the model parameters of the VAE and the surrogate channel model simultaneously. More specifically, the loss function used in the training can have three components, including the VAE reconstruction error (denoted $\|\zeta - \hat{\zeta}\|$), the Kullback-Leibler (KL) divergence between the surrogate and the true distribution of the latent variable (denoted $p(\eta)$), and the errors between the output of a physics-based high-fidelity channel model and the output of the surrogate channel model (denoted $\|R_x(u; \zeta) - \hat{R}_x(u; \eta(\zeta))\|$). Parameters of the high-fidelity HF channel model (denoted $\zeta$) belong to the higher-order parameter space, whereas parameters of the surrogate channel model (denoted $\eta(\zeta)$) belong to the lower-order parameter space. Because the true distributions of $R_x$ and $\hat{R}_x$ are intractable to analytical evaluation, in some embodiments, Monto Carlo (MC) methods can be used to approximate the expectation operators (e.g., when computing $\|\zeta - \hat{\zeta}\|$ and $\|R_x(u; \zeta) - \hat{R}_x(u; \eta(\zeta))\|$). The MC methods can sample from the distributions of the channel parameters $\zeta$ and the Kalman filter estimates u.

Because the training of VAE 402 and surrogate model 404, which can include the computation of the loss function, can be performed offline (e.g., using samples generated by the high-fidelity, physics-based channel model), the runtime computational cost can be reduced. At runtime, only the trained surrogate model of the channel and channel parameters with the reduced order will be used to predict the uncertainty propagation. To enable scalability with an increased number of MC samples, in some embodiments, the models (e.g., the VAE and the surrogate channel models) can be implemented using platforms and representations compatible with parallel executions (e.g., Pytorch, Jax objects). To further improve the execution efficiency, the surrogate channel model can be trained via a batch-execution training process, which is typical for neural-network (NN)-based models.

Figure 5:
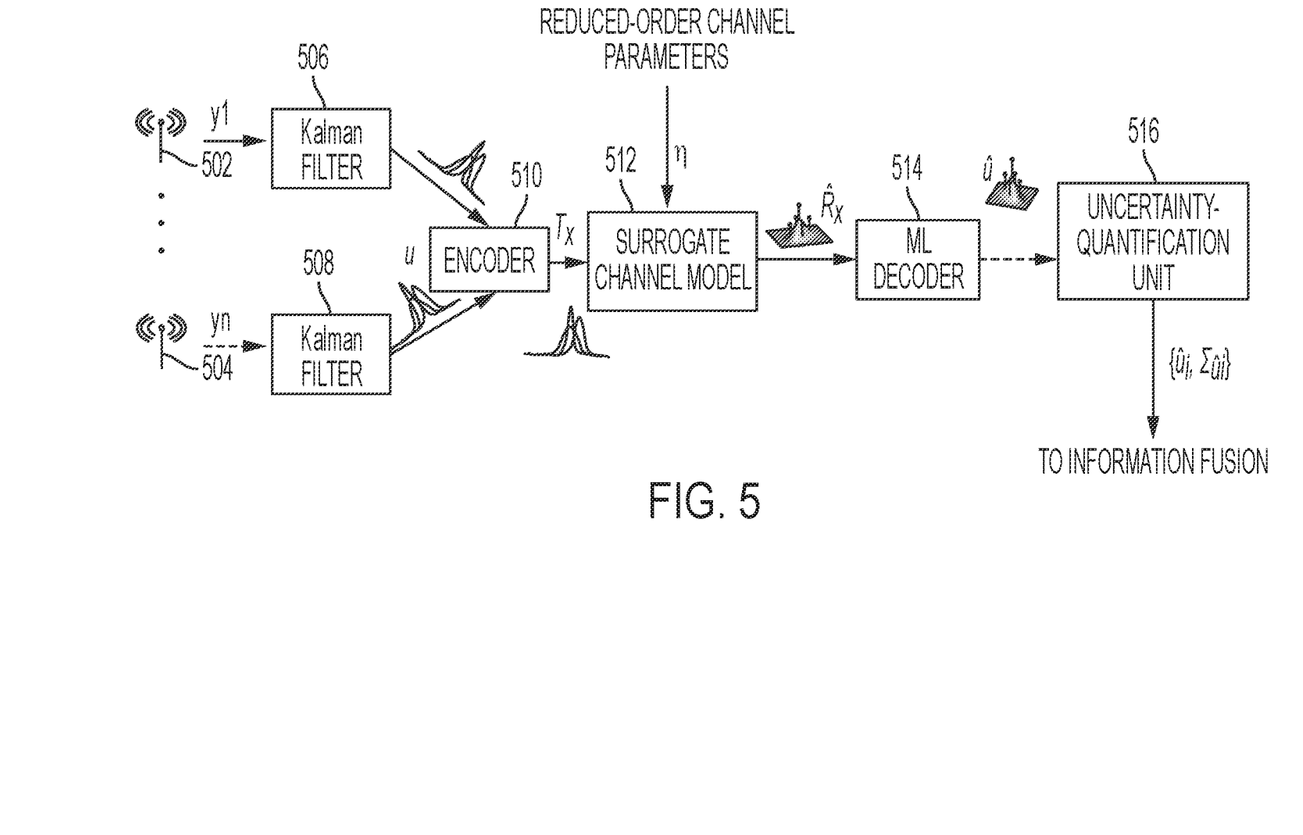
FIG. 5 illustrates an exemplary scheme for quantifying uncertainties in an estimate of a quantity of interest during runtime, according to one embodiment.

FIG. 5 illustrates an exemplary scheme for quantifying uncertainties in an estimate of a quantity of interest during runtime, according to one embodiment. During runtime, a number of sensors (e.g., sensors 502 and 504) can output measurement results of a QoI, denoted $y_i$. The outputs of the sensors are sent to corresponding Kalman filters (e.g., Kalman filters 506 and 508) or particle filters to produce an estimate of the QoI, denoted u, which includes statistical information (e.g., mean and/or variance) of the estimate. An encoder 510 (e.g., a QAM-based OFDM encoder) can encode the statistical information outputted by the Kalman filters into an RF signal $T_x$ that is to be transmitted over the HF channel.

A surrogate channel model 512 receives the reduced-order channel parameters η from a trained VAE, with η including the statistical distribution of the random channel parameters in the lower-dimension parameter space. Surrogate channel model 512 can simulate the behavior of the channel by predicting the output of the channel $\hat{R}_x(u,\eta)$, which can include a joint probability distribution of the Kalman filter estimate and the reduced-order channel parameter.

An ML-based decoder 514 can reconstruct the Kalman filter estimate û. Note that the output of ML-based decoder 514 can include uncertainty from the Kalman filter as well as the uncertainty from the HF channel. An uncertainty-quantification unit 516 can quantify the uncertainties associated with the reconstructed Kalman filter estimate by computing its statistical moments (e.g., the first and/or second moments). The reconstructed Kalman filter estimate and its statistical moments can be used by a subsequent information-fusion process to optimally combine information from multiple sensor systems. In some embodiments, the reconstructed Kalman filter estimate and its covariant matrix (i.e., $\{\hat{u}, \Sigma_{\hat{u}_i}\}$) can be used by the information-fusion process.

There are two approaches to quantifying the uncertainties of the output of ML-based decoder 514, the spectral-method approach and the unscented transform (UT) approach. The spectral-method approach can ensure high accuracy, whereas the UT approach can provide computational efficiency.

The spectral-method approach can represent the decoder output (i.e., the reconstructed Kalman filter estimate) as a spectral expansion. In some embodiments, the uncertainty-quantification process can include a process for learning an expansion of the channel output, i.e., $R_x(u; \zeta)=\Sigma_{j=1}^M r_j(u; w_j)\psi_j(\zeta)$, where M is the expansion size (i.e., the number of terms in the expansion), $r_j(u; w_j)$ are input-dependent coefficients modeled as neural networks, ζ is the random vector of channel parameters, and $\psi_j(\zeta)$ are orthogonal basis functions (e.g., Hermite polynomials, assuming Gaussian distribution of the channel parameters). Note that the output of the channel is the input to the decoder. The key process for learning the expansion coefficients can include evaluating inner products $\langle R_x(u; \zeta), \psi_j(\zeta)\rangle$ and $\langle \psi_i(\zeta), \psi_j(\zeta)\rangle$. In some embodiments, the evaluation of the inner products can be performed at the optimal quadrature points via a sparse-grid approach. Parameters (i.e., $w_j$) of the neural network can be learned by minimizing the loss function $$\frac{1}{N}\sum_{n=1}^N \sum_{j=1}^M \left\| \langle R_X(u^{(n)}; \zeta), \psi_j(\zeta)\rangle - r_j(u^{(n)})\langle \psi_j(\zeta), \psi_j(\zeta)\rangle \right\|^2$$

using gradient-based algorithms (e.g., ADAM), where N is the number of samples used for learning the parameters and M the number of expansion terms.

The result of the spectral expansion of the decoder input (i.e., $R_x$) can facilitate the spectral expansion of the decoder output (i.e., û(u; ζ)=Decoder($R_x$(u; ζ))) that embeds the two sources of uncertainties, the Kalman filter uncertainty and the channel uncertainty. More specifically, the spectral expansion of the reconstructed Kalman filter estimate (i.e., $\hat{u}(u; \zeta)=\Sigma_{j=1}^M \hat{u}_j(u; v_j)\psi_j(\zeta)$) can be computed by learning offline the expansion coefficients $\hat{u}_j(u; v_j)$ modeled as neural networks. The neural network parameters $v_j$ can be computed by minimizing the loss function $$\frac{1}{N}\sum_{n=1}^N \sum_{j=1}^M \left\| \langle \hat{u}(u^{(n)}; \zeta), \psi_j(\zeta)\rangle - \langle \text{Decoder}(R_x(u; \zeta)), \psi_j(\zeta)\rangle \right\|^2,$$

inspired by the Galerkin projection method, where $u^{(n)}$ are samples of the Kalman filter estimate.

Given the spectral expansion of the decoder output, the moments of the reconstructed Kalman filter estimate û can be approximated using optimal quadrature points generated by the random vectors u and ζ. For example, the first moment (or the mean) of û can be expressed as $\mu_{\hat{u}}=\mathbb{E}[\hat{u}(u; \zeta)]\approx\Sigma_{i,j}\alpha_{i,j}\hat{u}(u_i; \zeta_j)$, where $u_i$ and $\zeta_j$ are sparse grid points and $\alpha_{i,j}$ are weights associated with the grid points. A similar approach can be used to compute higher moments (e.g., the second moment or the covariance matrix $\Sigma_{\hat{u}}$). In some embodiments, instead of using the higher order channel parameter vector 7, the process for computing the moments of the reconstructed Kalman filter estimate û can use the reduced-order channel parameter vector η. When considering non-stationary (i.e., time-varying) channel parameter distributions, the spectral expansion coefficients can also have a temporal dimension.

The UT approach is less accurate compared with the spectral-method approach, but it can be more computationally efficient when computing moments of the reconstructed Kalman filter estimate û. In some embodiments, the moments (e.g., first and second moments) of û(u; ζ) can be computed via sigma points (which are selected sample points) of the UT. It has been shown that the UT can be used even for non-Gaussian random vectors that are transformed by a nonlinear map. By computing the sigma points of the joint random vector (u, ζ), whose number scales linearly with the dimension of the random vector, one can capture up to the diagonal components of the skewness (which is a measure of the asymmetry of the probability distribution) and kurtosis (which is a measure of the "tailedness" of the probability distribution) tensors. In the UT approach, the complete information flow will be considered, from the remote sensor to the output of the ML decoder. The computational complexity, in this case, stems from the evaluation of the sigma points, the number of which is a linear function of the dimension of the joint random vector (u, ζ). Unlike the spectral-method approach where the expansion coefficients are functions of the Kalman filter estimate u, the sigma points need to be updated every time the distributions of the Kalman filter estimate and the channel parameters change. Once the sigma points are updated, the moments of û(u; ζ) need to be re-evaluated as well.

In the OOT application, multiple sensors (e.g., sensors located on the same or different floating devices) can output their measurement results and an information-fusion unit can combine the measurement results to generate a final estimate of a QoI (e.g., the ocean temperature, the position of the floating device, the trajectory of a vessel, etc.). To generate a final estimate with minimal uncertainty, the information-fusion unit can optimally combine information from the multiple sensors by considering both the uncertainty in the measurements (e.g., the Kalman filter uncertainty) from each sensor and the uncertainty in the channel parameters. In some embodiments, a statistics-based estimator can implement a Fisher-information based fusion algorithm that optimally combines information from different sources. More specifically, to minimize errors in the final estimate, the information-fusion unit can maximize the norm of the Fisher information-metric while combining the information from the multiple sensor sources. For example, in the case where multiple remote sensors estimate the same QoI, the final estimate generated by the information-fusion unit can be computed as a weighted average of the remote estimates, where the weights are inversely proportional to the trace of the covariance matrices (i.e., $\Sigma_{\hat{u}}$) of the estimates.

Figure 6:
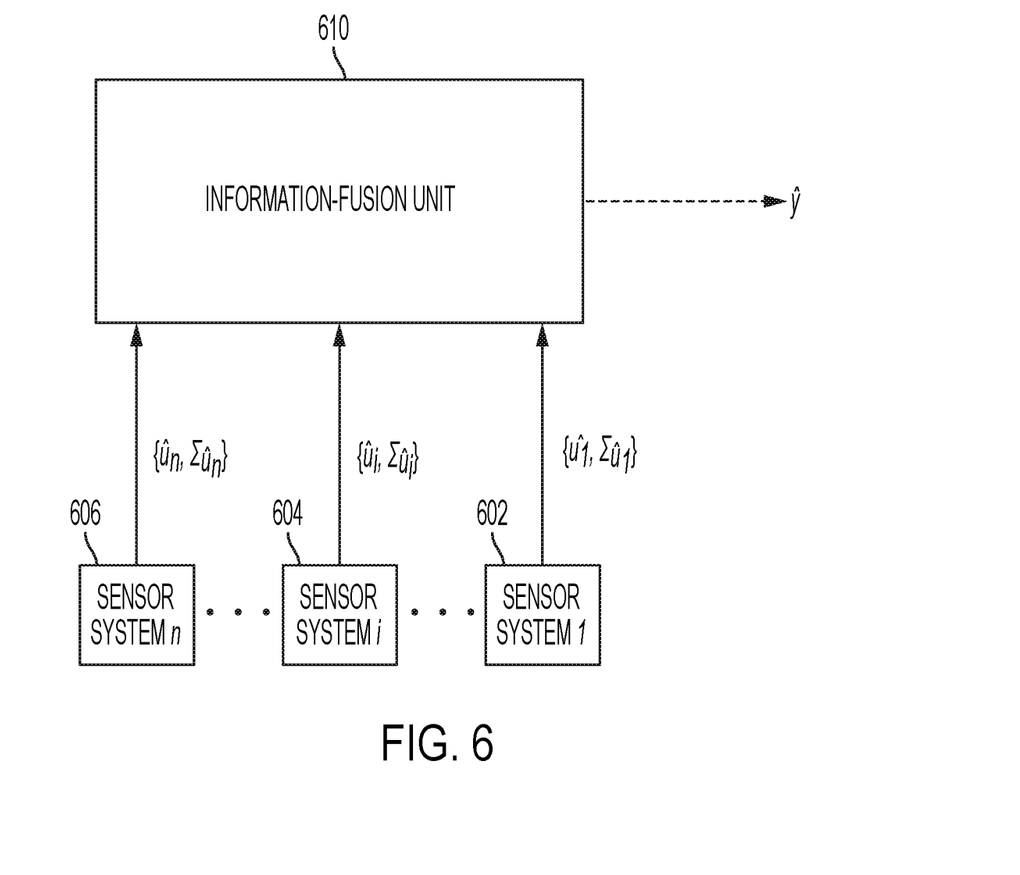
FIG. 6 illustrates an exemplary scheme for combining remote estimates from multiple sensor systems, according to one embodiment.

FIG. 6 illustrates an exemplary scenario for combining remote estimates from multiple sensor systems, according to one embodiment. In FIG. 6, a number of sensor systems 602, 604, and 606 can each output an estimate of a remote QoI along with a quantified measure of uncertainty associated with the estimate. Each sensor system can be similar to the sensor system performing the process shown in FIG. 5. In some embodiments, the quantified measure of the uncertainty can include probabilistic artifacts, such as probability distributions and moments (e.g., means, covariance matrices). In further embodiments, each sensor system can output the probability distribution of the Kalman filter estimate along with its covariance matrix (e.g., the output of the $i_{th}$ sensor system can be $(\hat{u}_i, \Sigma_{\hat{u}_i})$). FIG. 6 shows that an information-fusion unit 610 receives the estimates and their corresponding quantified uncertainty measures from multiple sensor systems (e.g., systems 602-606) and outputs a final estimated value of the QoI. For example, if each sensor system measures ocean temperature at a particular location, information-fusion unit 610 can output a final or reconstructed temperature estimate. This approach can scale easily with the number of remote sensors because, when considering all remote sensors, the total Fisher-information gain is the sum of the Fisher-information gains corresponding to each sensor.

In addition to having the multiple sensors measure the same QoI (e.g., the temperature at the same location), it is also possible to track multiple QoI targets with correlated position estimates where the association probabilities are jointly computed using the observations of all the QoI targets based on the joint probabilistic-data-association approach. For example, there can be multiple temperature sensors situated at different locations (e.g., on different floating devices) in order to provide temperature-gradient information. The probability distributions of the temperature and location estimates can be determined jointly, and the uncertainties associated with the temperature and location measurements should both be considered when combining the sensor outputs from the multiple sensors.

Figure 7:
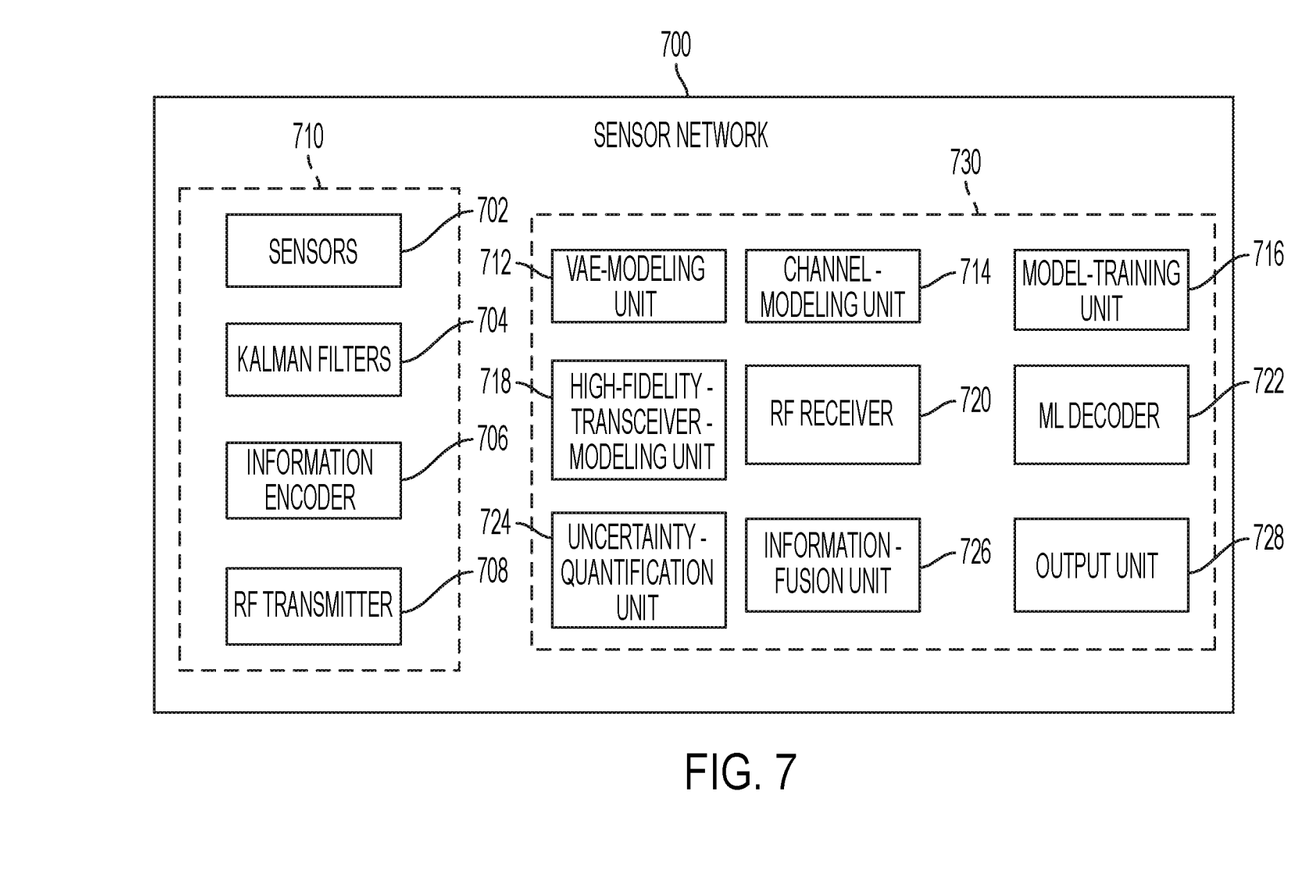
FIG. 7 presents a block diagram of an exemplary sensor network implementing HF communication for information delivery, according to one embodiment.

FIG. 7 presents a block diagram of an exemplary sensor network implementing HF communication for information delivery, according to one embodiment. In FIG. 7, a sensor network 700 can include sensors 702, Kalman filters 704, an information encoder 706, and an RF transmitter 708. In some embodiments, sensor network 700 can be part of an OoT system, with sensors 702, Kalman filters 704, information encoder 706, and RF transmitter 708 co-located on a floating device 710 in the ocean. Sensors 702 can include various types of sensors for collecting information associated with the surrounding environment, including but not limited to: temperature sensors, location sensors, sound sensors, RF sensors, flow sensors, pressure sensors, etc. Kalman filters 704 can receive outputs from sensors 702 to generate an estimate of a QoI along with statistical information associated with the estimate. In some embodiments, outputs of Kalman filters 704 can include the probability distribution of the estimate and its statistical moments (e.g., means and covariance). Information encoder 706 can encode the Kalman filter estimate and associated statistical information into an RF signal. In one embodiment, information encoder 706 can include a QAM-based OFDM encoder. RF transmitter 708 can transmit the RF signal encoded with the estimate and statistical information over an HF channel.

Sensor network 700 can include a VAE-modeling unit 712 and a channel-modeling unit 714. Both modeling units can implement a neural network, such as a deep recurrent neural network (deep-RNN). Channel-modeling unit 714 models the HF channel using a surrogate channel model. Compared with a physics-based channel model (e.g., the Watterson model), the surrogate channel model can have a reduced-dimension parameter space. Sensor network 700 can further include a model-training unit 716 configured to perform training on the VAE model and the surrogate channel model. In some embodiments, model-training unit 716 can jointly train the VAE model and the surrogate channel model, with the VAE model outputting channel parameters (in the form of probability distributions) with a reduced order to the surrogate channel model. The training can be performed offline using training samples (e.g., input and output signals of the channel) generated by a high-fidelity-transceiver-modeling unit 718, which can implement a high-fidelity transceiver model. The high-fidelity transceiver model can include a QAM-based OFDM encoder model, a physics-based channel model, and an ML-based symbol decoder model. During runtime, VAE-modeling unit 712 and channel-modeling unit 714 can jointly provide an estimate of channel parameters (e.g., based on known pilot bits included in the transmitted signals).

Sensor network 700 can include an RF receiver 720 and an ML decoder 722. RF receiver 720 can be configured to receive, during runtime, RF signals transmitted by RF transmitter 708 over the HF channel. ML decoder 722 can be configured to reconstruct symbols based on the received RF signals and the channel parameter estimates. According to some embodiments, ML decoder 722 can implement a deep-learning neural network configured to output the reconstructed symbols and their probability distributions. ML decoder 722 can also be trained offline using training samples (e.g., known symbols and corresponding RF signals outputted by the channel) generated by high-fidelity-transceiver-modeling unit 718.

Sensor network 700 can further include an uncertainty-quantification unit 724, an information-fusion unit 726, and an output unit 728. Uncertainty-quantification unit 724 can be responsible for quantifying the uncertainties associated with the reconstructed remote estimate (i.e., the deviation between the reconstructed QoI estimate and the actual QoI). The quantified uncertainties can include uncertainty from Kalman filters 704, the HF channel, and ML decoder 722. According to some embodiments, uncertainty-quantification unit 724 can compute approximations of the moments (e.g., first and second moments) of the Kalman filter estimate by performing spectral expansion on the input and output of ML decoder 722. Alternatively, uncertainty-quantification unit 724 can compute the moments (e.g., first and second moments) of the Kalman filter estimate by computing the sigma points of a joint random vector comprising the remote estimate and the channel parameters (i.e., (u, ζ)).

Information-fusion unit 726 can combine (or fuse) information received from different sensor systems to reconstruct a final estimate of the remote QoI (e.g., ocean temperature). It is desirable that information-fusion unit 726 can generate the final estimate with minimal uncertainty. According to some embodiments, information-fusion unit 726 can implement an information-fusion scheme based on the Fisher information metric. More specifically, when combining information from multiple sources (e.g., multiple sensor systems), information-fusion unit 726 can be configured to maximize the norm of the Fisher information metric. In one example, multiple sensor systems provide different estimates for the same QoI, and information-fusion unit 726 can generate the final estimate by computing a weighted average of the estimates from the multiple sensor systems, where the weight assigned for a particular sensor system is inversely proportional to the trace of the covariance matrix of the estimate provided by the particular sensor system. Output unit 728 can output the final estimate to other applications that may use the final estimate of the QoI to make decisions (e.g., planning or mapping maritime traffic, determining ocean temperature gradient, etc.).

In some embodiments, VAE-modeling unit 712, channel-modeling unit 714, model-training unit 716, high-fidelity-transceiver-modeling unit 718, RF receiver 720, ML decoder 722, uncertainty-quantification unit 724, information-fusion unit 726, and output unit 728 can be part of a sensor-data-receiver 730. More particularly, the above various units can reside on one or more cloud servers.

Figure 8:
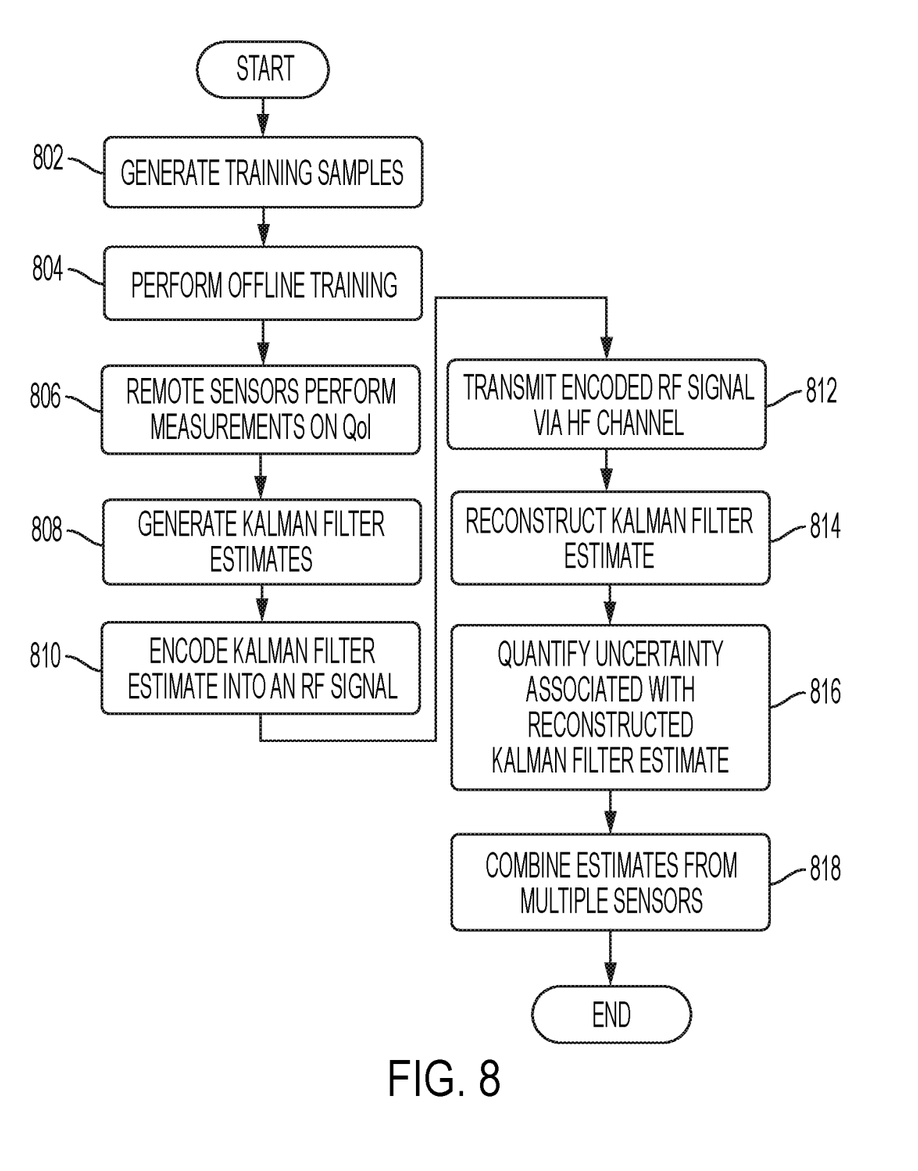
FIG. 8 presents a flowchart illustrating an exemplary process for estimating a remote quantity of interest (QoI), according to one embodiment.

FIG. 8 presents a flowchart illustrating an exemplary process for estimating a remote quantity of interest (QoI), according to one embodiment. Before runtime, the system can use a previously established high-fidelity transceiver model to generate a large number of training samples (operation 802). The high-fidelity transceiver model can include an information encoder (e.g., a QAM-based OFDM encoder) model, a physics-based HF channel model (e.g., a Watterson model), and an ML-based symbol decoder model. The system can use the training samples to perform offline training on a number of ML models, including a VAE model, a surrogate channel model, and an ML-based decoder model (operation 804). Each model can be implemented as a deep-learning neural network. In some embodiments, the VAE model and the surrogate channel model can be jointly trained.

During runtime, a number of remote sensors can perform measurements on one or more physical properties (e.g., temperature, pressure, location and/or speed of an object, etc.) of the environment surrounding the sensors (operation 806). The measurements of the physical properties can also be referred to as the measurements of the quantities of interest (QoIs). A corresponding number of Kalman filters or other types of QoI estimating mechanisms can generate estimates of the QoIs, which can include statistical information (e.g., probability distribution functions) associated with the estimates (operation 808).

An information encoder can encode the Kalman filter estimates into an RF signal (operation 810), and an RF transmitter can transmit the encoded RF signal to a receiver via an HF communication channel (operation 812). At the receiver, the previously trained VAE model and surrogate channel model can output estimates of the channel parameters. The estimated channel parameters can be non-deterministic, with each parameter corresponding to a probability distribution.

The previously trained ML decoder can reconstruct symbols (i.e., the Kalman filter estimate) based on the received RF signal and the channel parameter distributions (operation 814). The uncertainty-quantification unit can quantify the uncertainties associated with the reconstructed Kalman filter estimate by computing its moments (e.g., the first and/or second moments) (operation 816). In some embodiments, quantifying the uncertainties can include performing spectral expansion on both the received RF signal (i.e., the ML decoder input) and the ML decoder output. In alternative embodiments, quantifying the uncertainties can include computing the unscented transform of the input and output of the ML decoder. Note that computing the unscented transform can involve selecting a set of sigma points for the joint random vector that comprises the remote estimate and the random channel parameters. The second moment (i.e., the covariance matrix) of the reconstructed remote estimate can indicate the level of uncertainty associated with the remote estimate. For example, estimates with high variance can have a higher uncertainty level and be less reliable than estimates with low variance.

An information-fusion unit can combine estimates from multiple sensors (or sensor systems) to generate a final estimate of the remote QoI (operation 818). In some embodiments, the final estimate can be generated as a weighted average of the remote estimates, with the weight associated with a particular estimate being inversely proportional to the variance of the estimate (e.g., to the trace of the covariance matrix of a joint random vector associated with the remote estimate and the channel parameters). In some embodiments, when combining remote estimates from different sources (e.g., different sensor systems), the system can implement a statistics-based estimator that maximizes the norm of the Fisher information.

Figure 9:
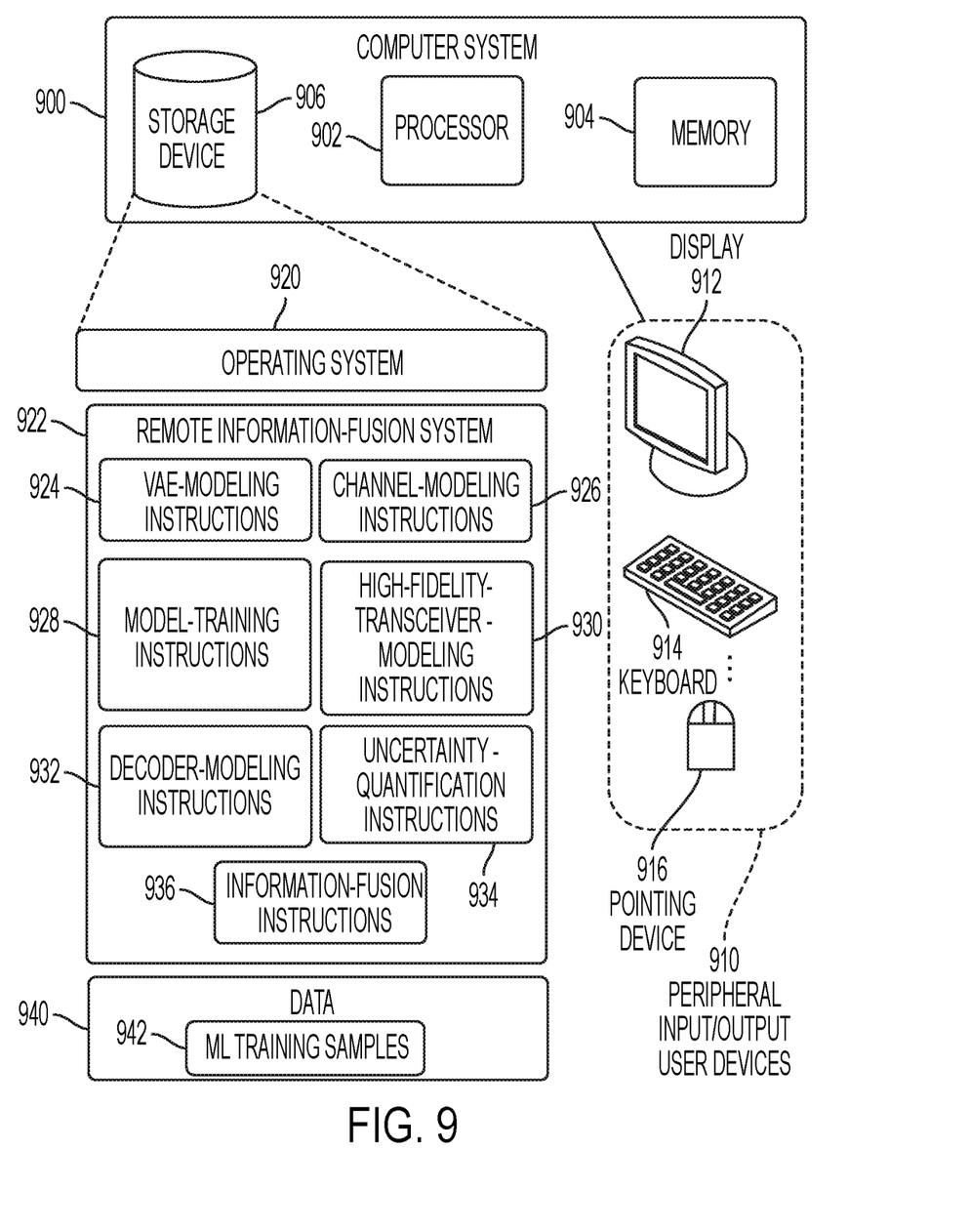
FIG. 9 illustrates an exemplary computer system that facilitates estimation of a remote QoI, according to one embodiment.

FIG. 9 illustrates an exemplary computer system that facilitates estimation of a remote QoI, according to one embodiment. Computer system 900 includes a processor 902, a memory 904, and a storage device 906. Furthermore, computer system 900 can be coupled to peripheral input/output (I/O) user devices 910, e.g., a display device 912, a keyboard 914, and a pointing device 916. Storage device 906 can store an operating system 920, a remote information-fusion system 922, and data 940.

Remote information-fusion system 922 can include instructions, which when executed by computer system 900, can cause computer system 900 or processor 902 to perform methods and/or processes described in this disclosure. Specifically, remote information-fusion system 922 can include instructions for modeling a VAE (VAE-modeling instructions 924), instructions for modeling the the HF channel (channel-modeling instructions 926), instructions for training the ML models (model-training instructions 928), instructions for modeling a high-fidelity transceiver (high-fidelity-transceiver-modeling instructions 930), instructions for modeling a decoder (decoder-modeling instructions 932), instructions for quantifying uncertainty associated with the reconstructed remote estimate (uncertainty-quantification instructions 934), and instructions for combining remote estimates from different sensor systems (information-fusion instructions 936).

In general, the disclosed embodiments provide a system and method that facilitate obtaining a reliable estimate of a remote QoI. More specifically, the remote QoI can be measured by a number of sensors and the corresponding Kalman filter estimates of the QoI can be encoded into RF signals and transmitted over HF channels. Both the Kalman filters and the HF channels can induce uncertainties to the outputs of the HF channels. To improve computational efficiency, a surrogate channel model with reduced-order channel parameters can be used to model the HF channel, and a VAE model can be trained jointly with the surrogate channel model to achieve the goal of order reduction. The joint training of the VAE and the surrogate channel model can be performed offline using training samples generated by a high-fidelity transceiver model. An ML decoder can reconstruct the Kalman filter estimate based on the received RF signal and the estimates of the channel parameters, and a level of uncertainty associated with the reconstructed Kalman filter estimate can be quantified by computing moments (e.g., the first and/or second moments) of the reconstructed Kalman filter estimate. A Fisher-information based information-fusion technique can be used to combine the reconstructed estimates from multiple sensor systems. Estimates with larger amounts of uncertainty can be given less weight than estimates with smaller amounts of uncertainty.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware units or apparatus. The hardware units or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware units or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for estimating a remote quantity of interest (QoI), the method comprising:
   receiving, at a receiver, a radio frequency (RF) signal carrying an estimate of the QoI measured by a sensor, wherein the RF signal is received over a communication channel;
   estimating probability distributions of a set of random channel parameters associated with the communication channel;
   reconstructing the estimate of the QoI based on the probability distributions of the channel parameters and the received RF signal;
   determining a level of uncertainty associated with the reconstructed estimate, wherein the determination comprises computing a covariance matrix of a joint probability distribution of the reconstructed estimate and the channel parameters; and
   combining reconstructed estimates from multiple sensors based on the determined level of uncertainty associated with each reconstructed Kalman filter estimate to output a combined estimate of the QoI.

2. The method of claim 1, wherein the communication channel comprises a high-frequency (HF) communication channel, and wherein estimating the probability distributions of the random channel parameters further comprises:
   training a surrogate channel model having a channel parameter space with a reduced dimension; and
   simulating behaviors of the HF communication channel using the trained surrogate channel model.

3. The method of claim 2, wherein training the surrogate channel model further comprises training the surrogate channel model jointly with a variational autoencoder (VAE) model that is configured to output channel parameters defined in the channel parameter space with the reduced dimension.

4. The method of claim 3, wherein the surrogate channel model and the variational autoencoder (VAE) model are trained jointly using training samples generated by a high-fidelity physics-based channel model.

5. The method of claim 1, further comprising encoding the estimate of the QoI into an RF signal to be transmitted over the communication channel using a quadrature amplitude modulation (QAM)-based orthogonal frequency-division multiplexing (OFDM) encoder.

6. The method of claim 1, wherein reconstructing the estimate comprises using a previously trained machine-learning decoder to directly learn probability distributions of symbols representing the Kalman filter estimate.

7. The method of claim 1, wherein computing the covariance matrix comprises performing spectral expansion on the reconstructed estimate.

8. The method of claim 1, wherein computing the covariance matrix comprises computing an unscented transform on the reconstructed estimate.

9. The method of claim 1, wherein combining the reconstructed estimates from the multiple sensors comprises assigning a weight to each reconstructed estimate, wherein the weight is inversely proportional to a trace of the covariance matrix.

10. A computer system for estimating a remote quantity of interest (QoI), the computer system comprising:
    a processor; and
    a storage device coupled to the processor and storing instructions, which when executed by the processor cause the processor to perform a method, the method comprising:
      receiving, over a communication channel, a radio frequency (RF) signal carrying an estimate of the QoI measured by a sensor;
      estimating probability distributions of a set of random channel parameters associated with the HF communication channel;
      reconstructing the estimate based on the probability distributions of the channel parameters and the received RF signal;

determining a level of uncertainty associated with the reconstructed estimate, wherein the determination comprises computing a covariance matrix of a joint probability distribution of the reconstructed estimate and the channel parameters; and combining reconstructed estimates from multiple sensors based on the determined level of uncertainty associated with each reconstructed estimate to output a combined estimate of the QoI.

11. The computer system of claim 10, wherein the communication channel comprises a high-frequency (HF) communication channel, and wherein estimating the probability distributions of the random channel parameters further comprises:

training a surrogate channel model having a channel parameter space with a reduced dimension; and simulating behaviors of the HF communication channel using the trained surrogate channel model.

12. The computer system of claim 11, wherein training the surrogate channel model further comprises training the surrogate channel model jointly with a variational autoencoder (VAE) model that is configured to output channel parameters defined in the channel parameter space with the reduced dimension.

13. The computer system of claim 12, wherein the surrogate channel model and the variational autoencoder (VAE) model are trained jointly using training samples generated by a high-fidelity physics-based channel model.

14. The computer system of claim 10, wherein the method further comprises encoding the estimate of the QoI into an RF signal to be transmitted over the communication channel using a quadrature amplitude modulation (QAM)-based orthogonal frequency-division multiplexing (OFDM) encoder.

15. The computer system of claim 10, wherein reconstructing the estimate comprises using a previously trained machine-learning decoder to directly learn probability distributions of symbols representing the estimate.

16. The computer system of claim 10, wherein computing the covariance matrix comprises performing spectral expansion on the reconstructed estimate.

17. The computer system of claim 10, wherein computing the covariance matrix comprises computing an unscented transform on the reconstructed estimate.

18. The computer system of claim 10, wherein combining the reconstructed estimates from the multiple sensors comprises assigning a weight to each reconstructed estimate, wherein the weight is inversely proportional to a trace of the covariance matrix.

* * * * *